(12) United States Patent
Fitzgibbons, Jr.

(10) Patent No.: US 6,423,129 B1
(45) Date of Patent: Jul. 23, 2002

(54) COATINGS AND ADDITIVES CONTAINING CERAMIC MATERIAL

(76) Inventor: Robert T. Fitzgibbons, Jr., 114 Victory Ave., Lackawanna, NY (US) 14218

( * ) Notice: Subject to any disclaimer, the term of this patent is extended or adjusted under 35 U.S.C. 154(b) by 0 days.

(21) Appl. No.: 09/503,829

(22) Filed: Feb. 15, 2000

Related U.S. Application Data

(60) Provisional application No. 60/159,669, filed on Oct. 15, 1999.

(51) Int. Cl.[7] ............... C04B 35/00; C04B 35/043
(52) U.S. Cl. ............... 106/287.35; 106/286.1; 106/286.5; 106/286.6; 501/94; 501/101; 501/155
(58) Field of Search ............... 106/483, 484, 106/632, 636, 287.35; 501/94, 101, 155

(56) References Cited

U.S. PATENT DOCUMENTS 3,634,068 A * 1/1972 Foard ............... 75/72
4,304,605 A * 12/1981 Keibler ............... 106/84

FOREIGN PATENT DOCUMENTS

EP 0857703 A2 * 12/1998 ......... C04B/35/622

* cited by examiner

*Primary Examiner*—David Brunsman
(74) *Attorney, Agent, or Firm*—James C. Simmons

(57) ABSTRACT

A coating for roofs and the like to inexpensively provide protection from ultraviolet light and for wood or steel substrates to inexpensively provide flame or chemical resistance respectively. The coating comprises an adhesive and a recycled ceramic powder and may also comprise a recycled granular ceramic material. An additive to sealants, caulking, and other construction materials to inexpensively provide improved fire resistance and insulation and other enhanced properties. The additive comprises a recycled ceramic powder and may also comprise a recycled granular ceramic material.

3 Claims, 1 Drawing Sheet

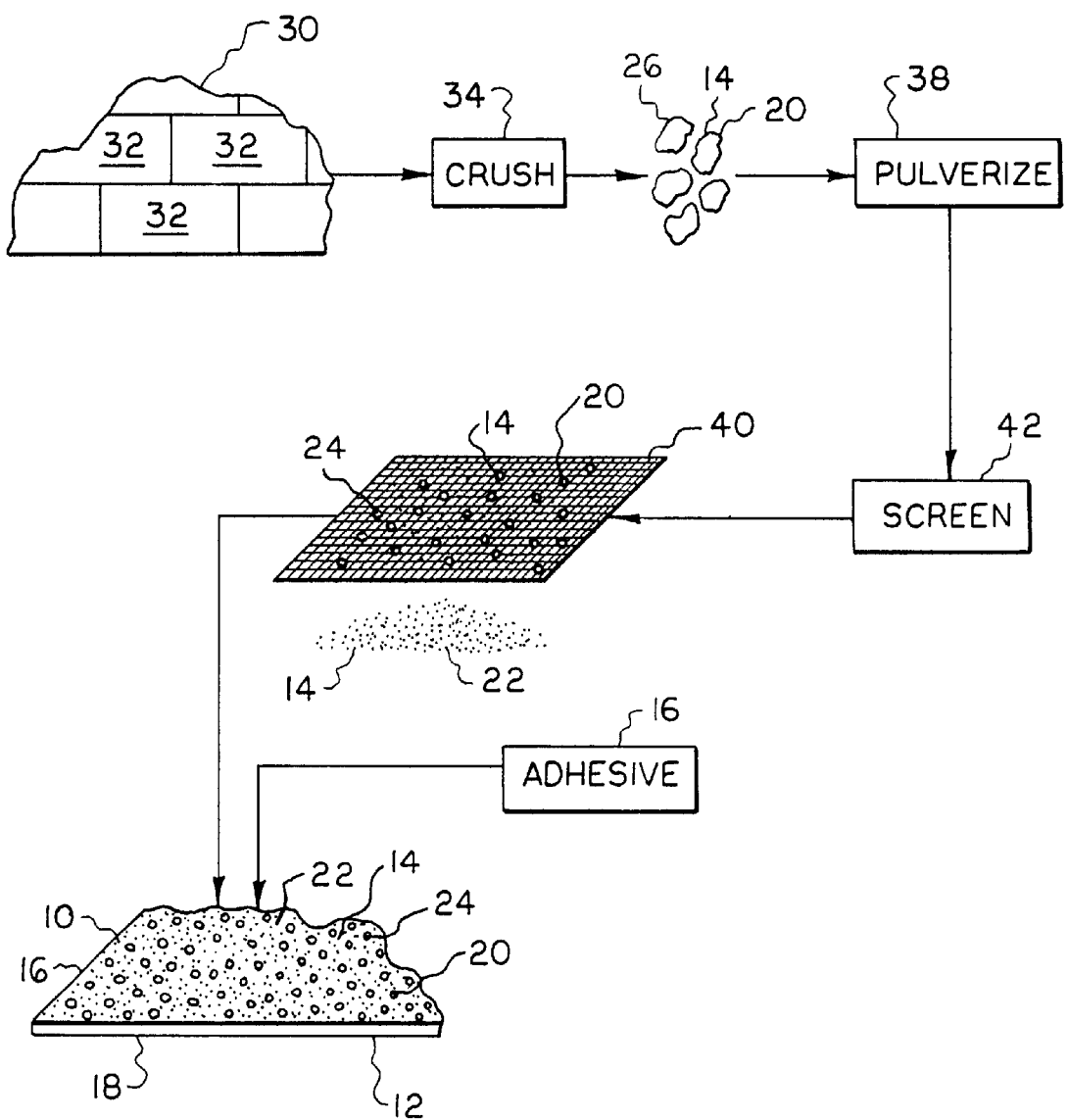

COATINGS AND ADDITIVES CONTAINING CERAMIC MATERIAL

Priority of U.S provisional application serial No. 60/159,669, filed Oct. 15, 1999, is hereby claimed. The disclosure of this provisional application is hereby incorporated herein by reference.

The present invention relates generally to coatings and additives such as for roofs and other applications in the building industry. More particularly, the present invention relates to the provision of ceramic material in such coatings and as such additives to impart heat resistance and other protective qualities to substrates.

Ceramic or refractory materials are commonly used, among other applications, in the form of blocks as linings of furnaces. When it is necessary to re-line a furnace, the ceramic blocks are removed and typically discarded to a landfill and replaced with new ceramic blocks made from a ceramic material such as alumina oxide, zircon, silica, or magnesia oxide. Sometimes, the ceramic blocks may be recycled by crushing them to form gravel which is then pulverized, and new ceramic blocks made therefrom.

Gunite materials, in the form of high pressure concrete mixes of cement, sand or crushed slag, and water, and the like have been sprayed over reinforcements. Ceramic materials have been used with an adhesive material as coatings and have been used as additives in the building industry. For example, roof cap sheets have been coated with 6 to 20 mesh quartz, and roof composite sheets have been coated with acrylic or alumina oxide in gravel form to protect against the effects of ultraviolet light. Not only are the use of ceramic materials prohibitively expensive but these applications do not adequately protect the roofs from the damaging effects of ultraviolet light since the coatings leave spaces between the ceramic particles through which ultraviolet rays can penetrate to the substrate.

It is accordingly an object of the present invention to provide a coating for roofs and the like which is effective to protect the substrate from the damaging effects of ultraviolet light so that the roof life may be increased from perhaps 10 years to perhaps 20 to 30 years.

It is another object of the present invention to provide such a coating at a favorable price.

It is a further object of the present invention to provide a coating for wood substrates which provides flame resistance.

It is yet another object of the present invention to provide a coating for steel substrates which provides chemical resistance.

It is still another object of the present invention to provide a ceramic material as an additive to sealants, caulking, and the like to provide improved fire resistance and insulation and other desirable properties but at a favorable price.

In order to provide an inexpensive ceramic coating, in accordance with the present invention, the coating is composed of an adhesive and a recycled ceramic material.

In order to provide an inexpensive ceramic additive, in accordance with the present invention, the additive is composed of recycled ceramic material.

In order to provide a ceramic coating which provides effective protection against the effects of ultraviolet light, the coating is composed of an adhesive material and ceramic material comprising ceramic gravel and ceramic powder.

The above and other objects, features, and advantages of the present invention will be apparent in the following detailed description of the preferred embodiment thereof when read in conjunction with the accompanying drawing.

BRIEF DESCRIPTION OF THE DRAWING

The FIGURE is a combination block and schematic view illustrating a portion of a roof cap and a method of making thereof which embody the present invention.

DETAILED DESCRIPTION OF THE PREFERRED EMBODIMENT

Referring to the FIGURE, there is shown at 12 a portion of a roof cap sheet (composed conventionally of fiberglass, asphalt, or other suitable material) to the upper surface of which a coating, illustrated at 10, has been applied. The coating 10 comprises a ceramic material 14 mixed into a suitable adhesive, illustrated at 16, such as, for example, a sodium silicate or mastics or any other suitable adhesive. After the adhesive has hardened, the ceramic material 14 is retained in place on the surface of the substrate 18. Although the substrate 18 is described as a roof cap sheet, it should be understood that it may be any other suitable substrate, such as wood or steel or other metals or concrete, suitable for application of the coating.

For the purposes of this specification and the claims, the term "ceramic" is defined as a refractory material such as used in lining furnaces and for other heat resistance purposes and is meant to include, but is not limited to, alumina oxide (including alumina silica and alloys of alumina such as mullite and alumina containing clays), zircon (including zirconia), silica (both crystalline and amorphous, for example, fume silica, and including alloys of oxides such as alumina and titania with the major phase being silica), and magnesia or periclase (both fused and dead burned and including alloys of magnesia such as dolomite and chrome). Alumina oxide, also known as corundum, is meant to include all naturally occurring and processed alumina, fused, calcined, and tabular and alumina contained in by-products including dust collector fines and sweepings.

Conventional coatings of quartz or other ceramic material of a size on the order of 6 to 20 mesh in an adhesive do not adequately protect the substrate against the damaging effects of ultraviolet radiation due to the large spaces between the portions of ceramic material allowing penetration of ultraviolet rays to the substrate. In order to provide an effective barrier to ultraviolet radiation. penetration to the substrate, in accordance with the present invention, the ceramic material is composed of a fine powder ceramic material, illustrated at 22, so as to completely cover the substrate. Preferably, the ceramic material is composed of a coarse granular ceramic material, illustrated at 20, in addition to the powder material 22 in order to provide increased strength, fire resistance, and insulation as well as a grit appearance. By "powder" is meant, for the purposes of this specification and the claims, a material comprising particles having a size of about 45 mesh or finer or otherwise being of such a small size as to be capable of being suspended in air. The granular material may include particles, illustrated at 24, having a size of around 6 to 30 mesh, or larger pieces of gravel, illustrated at 26, which may have a size of about ⅜ to ½ inch tumbled (to remove rough edges) or discrete pieces of material having any other suitable size suitable for the application. By "granular" is meant, for the purposes of this specification and the claims, particles which have a size greater than about 30 mesh.

In order to apply the coating 10, a layer of adhesive 16 may optionally first be applied to the substrate 18, then the granular particles, which may be either particles 24 or gravel 26 or both, are placed uniformly onto the adhesive, and finally the powder material 22 is uniformly sprayed onto the substrate 18 along with more of the adhesive 16 to thereby fully blanket the substrate with ceramic material to thereby fully protect against the damaging effects of ultraviolet radiation. Alternatively, both the granular particles 24 and powder material 22 may be sprayed onto the substrate with an adhesive together (and, if desired, gravel 26 laid loosely onto the substrate before spraying), or other suitable means may be used to apply the coating 10. Such a coating may be applied to roofing shingles, roof cap sheets, or composite roofing sheets at the factory or in the field. As a result, such a solid ceramic roof may have a much longer life, perhaps 20 to 30 years instead of 10 years, be uniform for improved appearance and with no exposed joints, and, also advantageously, it is unnecessary to use hot asphalt. Further, the coating 10 may be sprayed on quickly to save labor costs.

Other construction materials may be similarly coated in order to provide ultraviolet radiation protection or other forms of protection. Thus, wood structures may be coated with a suitable number of coats of the coating 10 to add insulation value and to prevent flame from breaking down the wood and thus provide a better fire rating to a structure. Steel or other metallic structures such as steel piping and metal roof decks may be coated with the coating 10 to provide chemical resistance (as well as corrosion and ultraviolet radiation). The coating 10 may be applied to the top of decks for insulation value and to the bottom thereof for fire resistance. The coating may be applied to flashings (to stabilize corners) to provide an improved appearance and better fire ratings as well as to save the time and labor required in otherwise preparing the flashings conventionally, i.e., one need only spray on the coating 10 and "walk away" to do other work. Various other uses for the coating 10 may be found in the construction trades, and such other uses are meant to come within the scope of the present invention.

The ceramic material 14 may also be provided as an additive to various construction materials to enhance the properties thereof. Thus, the ceramic material 14 may be added to, for example, sealants (for example, for sealing of concrete floors, walls, and ceilings), stucco, and caulking to provide fire resistance, insulation value, and increased strength. The ceramic material additive 14 may comprise the powder 22 or, if desired to provide a grit look as well as increased strength, fire resistance, and insulation, granular particles 20 in addition to or instead of the powder.

New ceramic materials are too expensive for practical and competitive application in the construction industry as described above. However, ceramic materials are commonly discarded to landfills. Thus, by recycling the used ceramic materials for use in the coatings and additives of the present invention, the cost may be substantially reduced so that it is practical and competitive while providing an improved product, Therefore, in accordance with a preferred embodiment of the present invention, the ceramic material 14 is recycled, i.e., formed or collected from ceramic material which has been previously used for any purpose such as the lining of furnaces. Thus, illustrated at 30 is a portion of a wall of a furnace which contains blocks 32 of ceramic material, From time to time, the furnace must be re-lined with the result that the blocks 32 are removed. The removed uses blocks 32 are typically obtainable at no cost except transportation costs. In order to recycle the blocks 32, they may first be placed in a conventional jaw crusher, as illustrated at 34, to compress and shatter them to thereby form the gravel 26. The gravel 26 is then placed in a conventional pulverizer, as illustrated at 38, to form a mixture of the granular particles 24 and the powder 22. The granular particles 24 and the powder 22 are then separated by use of a screen 40, as illustrated at 42, of a size wherein the powder 22 falls through the screen 40 and the granular particles 24 do not fall through the screen 40. This inexpensive process for recycling the ceramic material is conventional in the art for the purpose of providing ceramic blocks for lining of furnaces and allows the ceramic material to be provided inexpensively. However, any other suitable process for recycling the ceramic material may be used.

The use of the inexpensive recycled ceramic material in the coatings and additives of the present invention allows its use to be sufficiently inexpensive as to be practical and competitive in the building industry (while providing superior building structures) while also helping to preserve the environment.

It should be understood that, while the present invention has been described in detail herein, the invention can be embodied otherwise without departing from the principles thereof, and such other embodiments are meant to come within the scope of the present invention as defined by the appended claims.

What is claimed is:

1. A coating composition for a substrate, the coating composition comprising granular ceramic material, ceramic powder, and an adhesive, wherein said granular material and said ceramic powder are made from used furnace lining, said ceramic powder being dispersed in the adhesive in a sufficient quantity to provide complete coverage with ceramic material of a portion of substrate to which the coating is applied.

2. A method of enhancing properties of a structural member portion comprising making recycled ceramic material from used furnace lining and applying a coating of the recycled ceramic material and an adhesive to the structural member portion, the method further comprising selecting the recycled ceramic material to include granular ceramic material and ceramic powder wherein the ceramic powder is applied in a sufficient quantity in the adhesive to provide complete coverage of the structural member portion with ceramic material, and the method further comprises allowing the adhesive to harden.

3. A method according to claim 2 wherein the step of applying a coating comprises firstly applying the adhesive to the structural member portion, then applying the granular ceramic material to the adhesive, then spraying the ceramic powder mixed with adhesive onto the structural member portion.

* * * * *